United States Patent [19]

Connell

[11] Patent Number: 4,621,923

[45] Date of Patent: Nov. 11, 1986

[54] PRODUCTION OF PRINTS

[75] Inventor: Bruce R. Connell, Collaroy Plateau, Australia

[73] Assignee: Oberview Pty. Ltd., Artarmon, Australia

[21] Appl. No.: 778,089

[22] Filed: Sep. 20, 1985

[30] Foreign Application Priority Data

Sep. 21, 1984 [AU] Australia ..................... PG7249

[51] Int. Cl.[4] .................... G03B 27/52; G03C 3/00

[52] U.S. Cl. .................................. 355/133; 430/15

[58] Field of Search ................. 355/133, 40; 428/203; 40/442; 430/14, 15

[56] References Cited

U.S. PATENT DOCUMENTS 1,899,962 3/1933 Higginbotham ..................... 430/15

2,020,087 11/1935 Treshansky et al. ................ 40/442

2,880,541 4/1959 Kahn ................................ 428/203

3,492,925 2/1970 Ditzer, Jr. et al. .................. 430/14

3,776,725 12/1973 McCann et al. ..................... 430/15

4,115,003 9/1978 Nachtrieb ......................... 355/133

*Primary Examiner*—Richard A. Wintercorn

*Attorney, Agent, or Firm*—Browdy and Neimark

[57] ABSTRACT

A print assembly for viewing both by reflected and transmitted light consisting of a first image being a photographic or printed color reproduction having the appearance of an image of normal density and color for viewing by reflected light and an identical second image arranged behind and in exact register with the first but being underexposed or of lesser density in relation to the first. Where a photographic process is used the images may be formed on the front and rear of a single transparent substrate.

5 Claims, No Drawings

PRODUCTION OF PRINTS

The present invention relates to the production of prints and more particularly to the production of photographic or printed colour reproductions intended to be viewed both by reflected and transmitted light.

Publicity material in the form of large sized photographic colour prints is commonly used, for example in shop windows, and such prints are normally prepared on a base material to make them suitable either for viewing by reflected light or viewing by transmitted light. It has not hitherto been possible to provide a print that is equally satisfactory when viewed by reflected or transmitted light. A print designed for viewing by reflected light, if viewed by transmitted light tends to have a washed out appearance making it relatively unattractive. With a print designed for viewing by transmitted light very little of the image can be seen by reflected light.

The object of the present invention is to provide prints which may be produced either by a photographic or printing process which are equally suitable for viewing by reflected or transmitted light.

The present invention consists in a print assembly comprising a first image being a photographic or printed colour reproduction, having the appearance of an image of normal density and colour for viewing by reflected light, and an identical second image arranged behind and in exact register with the first but being under exposed or of lesser density in relation to the first. Preferably the finished print assembly is coated front and back with a protective coating acting to prevent deterioration by ultraviolet light.

Where photographic methods are used a convenient way of carrying out the invention is to use a transparent substrate which is coated with light sensitive emulsion on both faces, the first and second images being formed on the front and rear of the substrate respectively.

In putting the invention into practice by photographic methods a top colour print of a scene or subject constituting the first image is prepared in a conventional manner for viewing by reflected light. Any conventional photographic paper may be used provided that it is transparent or translucent and does not contain any water-mark or back marking. A second or base print constituting the second image is then prepared in a similar manner but in the preparation of the second print it is under exposed in relation to the top print by a factor which will depend very much on the subject. The object is to provide a second print which is less dense than the first. The degree to which the density of the second print differs from the first may vary considerably from nearly zero in an extreme case in which the subject was a plain black object on a white ground to 100%.

For the normal range of subjects the density of the second image is within the range of 40% to 60% of the density of the first image.

After the preparation of the prints the second print is secured to the rear of the first, the subject of the two prints being in exact register and the prints being secured together by a suitable adhesive. A variety of adhesives may be used such as pressure sensitive, contact and moisture curing adhesives, provided they are optically clear.

Where a photographic means of reproduction is used an alternative approach may be adopted. This is dependent on the availability of photographic paper or transparent material which is coated on both sides with a photosensitive emulsion. In this procedure the emulsion on one side is exposed directly to the subject and the emulsion on the other side is exposed to the subject indirectly through mirrors arranged to produce an image on the emulsion on the other side which is in exact register with the first image. Any appropriate arrangements are included to ensure that the second image is of lesser density than the first either by reducing the exposure time for the second emulsion or by the inclusion of a grey filter in the light path to the second emulsion. Where a sufficient number of identical print assemblies were to be produced it might be practical to use different emulsions on the two sides to ensure that the second image was less dense than the first.

It has been found that by these means a print may be made which is equally suitable for viewing by reflected light or viewing by transmitted light. Thus a print can be arranged in a shop window in such a way as to be viewed by daylight during the daytime, the print being provided with a rear source of illumination which can be switched on at night and the print viewed by transmitted light. It has been found that it is possible to prepare prints in which all the desirable characteristics are preserved in both forms of viewing.

While it is anticipated that the major application of the invention will be in the production of photographic prints it would be quite possible to produce top and base prints having a suitable relationship by a printing process such as off-set colour printing in which case the lesser density of the second print can be achieved by the use of a different screen.

As prints of all sorts are adversely affected by exposure to ultraviolet light fairly rapidly it is desirable that the front and rear surfaces of the print shall be protected by a coating acting to prevent deterioration under the effect of ultraviolet radiation. A polymer coating such as that sold under the designation "3M Photoguard" is very suitable for this purpose.

Some photographic printing papers are to some extent tinted with an ivory or off-white tint, this may, however be overcome in the second print by exposing the print to a secondary blue light source. This will prevent the tinting of highlights in the print by the natural tint of the paper when viewed by transmitted light.

Phosphorous fluorescing agents and brighteners may be used either between the two prints or on the front of the top print to highlight the image or provide an additional image when the print is exposed to ultraviolet light. A print can thus be created which has a particular appearance when viewed by ordinary reflected light or transmitted light and a different, additional or enhanced appearance when illuminated by ultraviolet light from a separate source.

Preferably the finished print is adhered to a rigid clear transparent sheet material such as polymethylmethacrylate.

I claim:

1. A print assembly comprising a first image being a colour reproduction having the appearance of an image of normal density and colour for viewing by reflected light, and an identical second image arranged behind and in exact register with the first but being under exposed or of lesser density in relation to the first.

2. A print assembly as claimed in claim 1, wherein both images are formed by a photographic process.

3. A print assembly as claimed in claim 2, wherein the first image is formed on a transparent or translucent substrate coated with a photo-sensitive emulsion, the second image being formed on a second similar sheet and the sheets being secured together with the images in exact register.

4. A print assembly as claimed in claim 2, wherein the first and second images are formed on front and rear surfaces of a sheet of transparent or translucent material coated on both sides with a photo-sensitive emulsion.

5. A print assembly as claimed in claim 1, wherein the first and second images are formed by a printing process.

* * * * *